(12) United States Patent
Richter

(10) Patent No.: US 12,120,235 B2
(45) Date of Patent: Oct. 15, 2024

(54) APPARATUS AND METHODS FOR AUTOMATED CREDENTIAL GENERATION

(71) Applicant: Linda Lee Richter, Oakland, CA (US)

(72) Inventor: Linda Lee Richter, Oakland, CA (US)

(*) Notice: Subject to any disclaimer, the term of this patent is extended or adjusted under 35 U.S.C. 154(b) by 0 days.

(21) Appl. No.: 18/112,824

(22) Filed: Feb. 22, 2023

(65) Prior Publication Data

US 2024/0283649 A1 Aug. 22, 2024

(51) Int. Cl.
*H04L 9/32* (2006.01)
*H04L 9/08* (2006.01)

(52) U.S. Cl.
CPC .......... *H04L 9/3213* (2013.01); *H04L 9/0866* (2013.01); *H04L 9/3297* (2013.01)

(58) Field of Classification Search
CPC .... H04L 9/3213; H04L 9/0866; H04L 9/3297
See application file for complete search history.

(56) References Cited

U.S. PATENT DOCUMENTS

| | | | | |
|---|---|---|---|---|
| 8,909,924 B2* | 12/2014 | Lord | ..................... | H04L 9/3297 713/165 |
| 11,586,766 B1* | 2/2023 | Stewart | ................. | G06F 16/285 |
| 2015/0106883 A1* | 4/2015 | Miller | ..................... | G06F 16/93 726/4 |
| 2018/0329987 A1* | 11/2018 | Tata | .......................... | G06N 3/08 |
| 2020/0162256 A1* | 5/2020 | Pourtabatabaie | ..... | H04L 9/0872 |
| 2020/0328891 A1* | 10/2020 | Drouot | ................... | H04L 9/0637 |
| 2020/0351094 A1* | 11/2020 | Canterbury | ........... | H04L 9/0637 |
| 2022/0255733 A1* | 8/2022 | Hakim | .................. | H04L 9/3234 |
| 2023/0327875 A1* | 10/2023 | Tsai | ....................... | H04L 9/0838 726/9 |
| 2023/0368213 A1* | 11/2023 | Adeli-Nadjafi | ........ | G06N 5/022 |

* cited by examiner

*Primary Examiner* — J. Brant Murphy
(74) *Attorney, Agent, or Firm* — Caldwell Intellectual Property Law

(57) ABSTRACT

An apparatus and method for automated credential generation, the apparatus includes at least a processor, and a memory communicatively connected to the at least a processor, wherein the memory containing instructions configuring the at least a processor to receive a data collection, wherein the data collection comprises a plurality of data objects, and wherein the plurality of data objects comprises at least an attribute datum, parse the data collection using a credential validation module to identify and extract the at least an attribute datum associated with the user, classify the data collection to at least a credential datum as a function of the at least an attribute datum using the credential validation module, and generate a verifiable credential as a function of the at least a credential datum.

20 Claims, 8 Drawing Sheets

APPARATUS AND METHODS FOR AUTOMATED CREDENTIAL GENERATION

FIELD OF THE INVENTION

The present invention generally relates to the field of generating user credentials on a decentralized platform. In particular, the present invention is directed to apparatus and methods for generating user credentials associated with a Non-Fungible Token (NFT) transaction automatedly.

BACKGROUND

Collectibles, gaming assets, metaverse, digital art, music, video, domains, physical items, real estate, life moments, and events represent some of the current NFT use cases, where the primary focus of NFT has been the representation of something of value as a blockchain-based token and the utilization of NFT in smart contract applications. The total NFT trading volume and the types of NFT transactions have increased exponentially over the years. However, existing solutions are insufficient to unlock new use cases of NFTs as interactions between users are limited due to lack of verifiable credentials.

SUMMARY OF THE DISCLOSURE

In one aspect an apparatus for automated credential generation is disclosed. The apparatus includes at least a processor, and a memory communicatively connected to the at least a processor, wherein the memory containing instructions configuring the at least a processor to receive a data collection, wherein the data collection comprises a plurality of data objects, wherein the plurality of data objects comprises at least an attribute datum, parse the data collection using a credential validation module to identify and extract the at least an attribute datum associated with the user, classify the data collection to at least a credential datum as a function of the at least an attribute datum using the credential validation module, and generate a verifiable credential as a function of the at least a credential datum.

In another aspect a method for automated credential generation is disclosed. The method includes receiving, by at least a processor, a data collection, wherein the data collection comprises a plurality of data objects, wherein the plurality of data objects comprises at least an attribute datum, parsing, by the at least a processor, the data collection using a credential validation module to identify and extract the at least an attribute datum associated with the user, classifying, by the at least a processor, the data collection to at least a credential datum as a function of the attribute datum using the credential validation module, and generating a verifiable credential as a function of the at least a credential datum.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
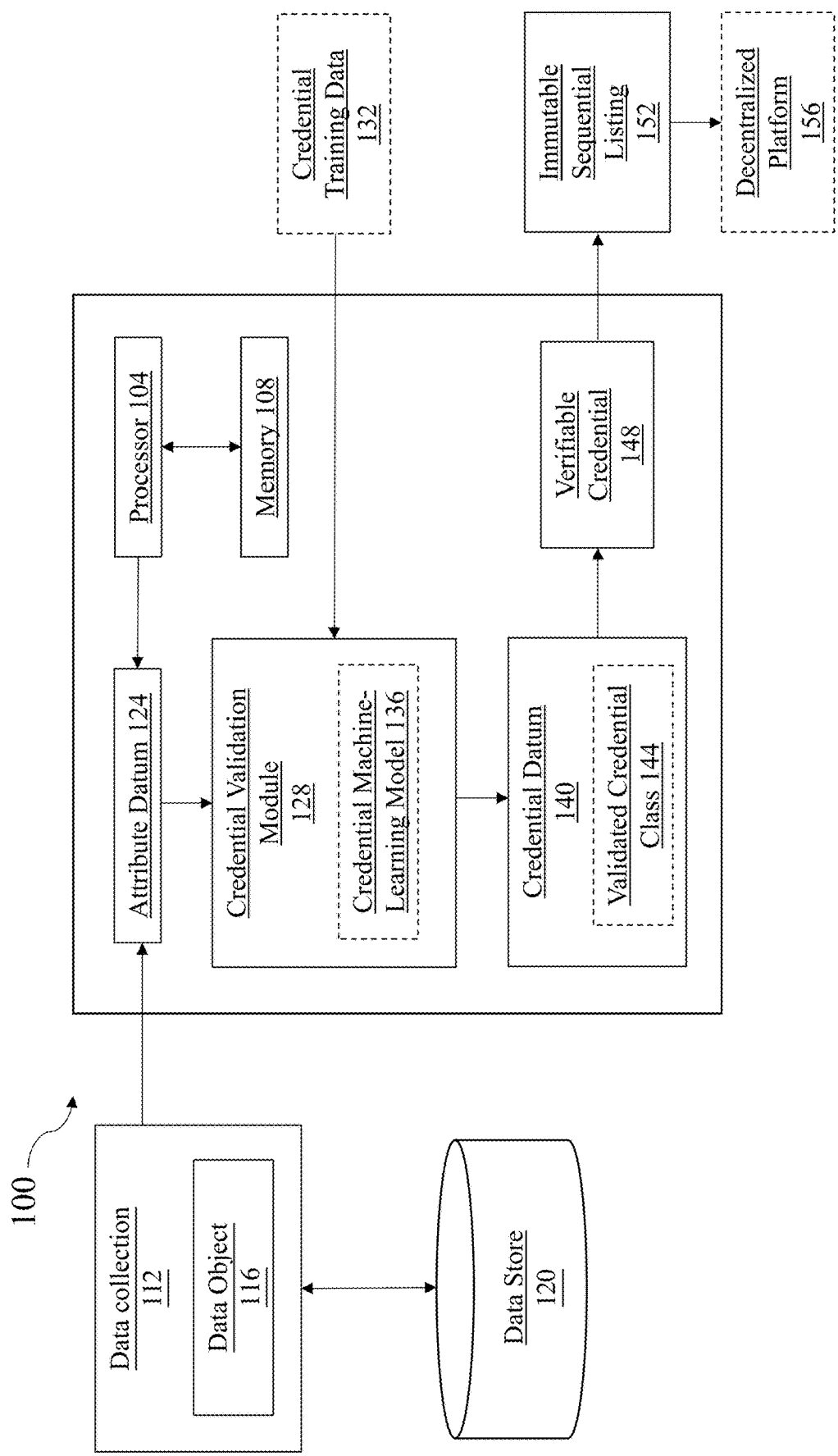
FIG. 1 is a block diagram of an apparatus for automated credential generation.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and methods for automated credential generation. In some embodiments, credential generation may include a token or other data structure representing validation of a user, an access level, a timeframe for the access level and/or validation, or the like. The credential may be a tokenized credential generated by a self-executable data structure.

Aspects of the present disclosure can be used to provide credential as a "blue check mark" for a verified user. In some embodiments, some of the generated credentials may be publicly available, other may be hidden from user community but may still affect access rights.

Aspects of the present disclosure may also be directed to credentials stored in an immutable sequential listing such as a blockchain, wherein the credentials may be linked to an attested time, or the like.

Exemplary embodiments illustrating aspects of the present disclosure are described below in the context of several specific examples.

In an embodiment, methods and apparatuses described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q. A further example of asymmetrical cryptography may include lattice-based cryptography, which relies on the fact that various properties of sets of integer combination of basis vectors are hard to compute, such as finding the one combination of basis vectors that results in the smallest Euclidean distance. Embodiments of cryptography, whether symmetrical or asymmetrical, may include quantum-secure cryptography, defined for the purposes of this disclosure as cryptography that remains secure against adversaries possessing quantum computers; some forms of lattice-based cryptography, for instance, may be quantum-secure.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. In one embodiment, credentials generated are verifiable credentials that are tamper-proof statements regarding a user that are cryptographically signed by a generator of the credentials. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly 1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatun hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of 2256 operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Embodiments described in this disclosure may perform secure proofs. A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. In some embodiments, a verifier may authenticate the generated credential via a decentralized identifier by using public/private key pairs on an immutable sequential listing to verify that the hashed credential belongs to a specific user. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. In some embodiments, through zero-knowledge proof claims, users may not need to expose their private credential and/or identity information to a decentralized platform as the validity of users' real-world credential and/or identity information is attested via a privacy-preserving protocol enabled by zero-knowledge proof technology while still remain private. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Embodiments described in this disclosure may utilize, evaluate, and/or generate digital signatures. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Referring now to FIG. 1, an exemplary embodiment of apparatus 100 for automated credential generation is illustrated. A "credential," as used in this disclosure, is a digital assertion of a user's suitability based on aspects of the user's background. In some embodiments, a user's credential may include a validation of the user's legal identity, social identity, financial identity, proof of creation, proof of interaction, proof of personhood, and the like. For instance, in a non-limiting example, the legal identity may include the user's real name, date of birth, home address, government ID such as driver's license, credit report, social security number, and the like. As used in this disclosure, a "social identity," is any identity information derived and/or attested from a relevant social group where the user is a member of. For instance, in a non-limiting example, the user's social identity may include identities and/or membership associated with a social media platform such as Facebook®, Twitter®, membership associated with a decentralized community, and the like. In some embodiments, the user's social identity may be the user's profile name and/or pictures associated with the user profile. "Financial identity," as used in this disclosure, is identity information associated with a user's finance such as personal assets, income, expense, debts, and the like. "Proof of creation," as used in this disclosure, is evidence regarding ownership and/or chain of title of an NFT. For instance, proof of creation may include data records such as smart contracts to establish ownership of an NFT. "Proof of interaction," as used in this disclosure, is records of prior transactions and/or interactions that a user has been involved in. For instance, in a non-limiting example, transaction history may include trading, selling, buying, renting, licensing an NFT. In another non-limiting example, prior interactions may include interactions with an NFT owner, a user and/or a user community, and the like. "Proof of personhood," as used in this disclosure, is evidence and/or records showing the condition and/or quality of a user. In some embodiments, personhood may include user qualification, personal profile, health information, personal qualities, and the like. "User qualification," as used in this disclosure, are accomplishments and/or achievements that may make a user suitable for a particular role and/or activity. In some embodiments, qualifications may include diploma, level of education, certificates received, personal experience, and the like. "Personal profile," as used in this disclosure, is a description and/or representation of a user. For instance, in a non-limiting example, personal profile may include age, employment, hobbies, and the like. "Health information," as used in this disclosure, are records associated with a user's wellness. In a non-limiting example, health information may include insurance, medical records, disease records, lifestyle, and the like. "Personal qualities," as used in this disclosure, are characteristics, attributes, trustworthiness, propensity, and/or personal traits of a user. In some embodiments, personal qualities may include the user's social reputation in a decentralized community and/or in real life.

Continuing to refer to FIG. 1, apparatus 100 includes at least a processor 104 and a memory 108 communicatively connected to processor 104, wherein memory 108 contains instructions configuring processor 104 to perform various functions. In one embodiment, and without limitation, processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software and the like.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

Still referring to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, as used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, apparatus and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, memory 108 contains instructions configuring processor 104 to receive a data collection 112, wherein data collection 112 includes a plurality of data objects 116. The plurality of data objects 116 includes at least an attribute datum 124. As used in this disclosure, "receive" means to accept, collect, or otherwise gather input from a user, a device, and/or a data store that stores such information. A "data collection," as used in this disclosure, is an element containing a data object related to the user. In addition, a "data object," as used in this disclosure, is a single element of data. In some cases, data collection 112 may include a plurality of data objects 116. In a non-limiting example, data collection 112 may be a string containing a plurality of words, wherein each word may be data object 120. In some cases, data collection 112 may be in various format such as, without limitation, txt file, JSON file, word document, pdf file, excel sheet, image, video, audio, and the like thereof. In other cases, data collection 112 may be present in any data structure described in this disclosure. In some embodiments, without limitation, data collection 112 may include information related to the user's legal identity, social identity, financial identity, proof of creation, proof of interaction, proof of personhood, and the like. An "attribute datum," as used in this disclosure, is datum that is relevant to the evaluation of a user's credential. In a non-limiting example, the at least an attribute datum 124 may include a user's legal identity, social identity, financial identity, proof of creation, proof of interaction, and proof of personhood, and the like. In some embodiments, data collection 115 may include information related to a role associated with an NFT and/or types of NFTs. A "role," as used in this disclosure, is a user designation for a specific usage of an NFT. For instance, in a non-limiting example, a role associated with an NFT may include a delegee, a lessee, a renter, a user, a proxy, a tenant, a sub-tenant, a collector, a contributor, a collaborator, a project member, a community member, and the like. "Types of NFTs," as used in this disclosure, are NFTs with different usage. For instance, in a non-limiting example, types of NFTs may include a utility NFT, a rental NFT, a fractional NFT, a governance NFT, and the like. In some embodiments, certain aspects of a role associated with an NFT and the types of NFTs may be consistent with the role associated with NFTs as disclosed in U.S. patent application Ser. No. 18/112,196, filed on Feb. 21, 2023, titled "AN APPARATUS AND METHODS FOR DELEGATING A ROLE ASSOCIATED WITH NON-FUNGIBLE TOKENS (NFTS) USING A SELF-EXECUTABLE DATA STRUCTURE," which is incorporated by reference herein in its entirety. Association with an NFT may include incorporation in the NFT and/or in a record, such as an immutable sequential listing posting, referring to and/or creating the NFT, of one or more elements of data associated with and/or linked to the data associated with and/or represented by the NFT. For instance, NFT may contain and/or be linked to a representation of data associated with and/or represented by the NFT, where the representation may include a uniform resource locator (URL) or other uniform resource identifier (URI) indicating the data and/or a location where the data may be found and/or viewed, a cryptographic hash of the data, a secure proof of the data and/or proof of knowledge of the data and/or a digital signature created using such proofs and/or the data and/or generated by a person or device associated therewith using, for instance an immutable sequential listing posting or the like, an identifier such as a universally unique identifier (UUID), a globally unique identifier (GUID), an identifier assigned within a system, platform and/or immutable sequential listing, a database record or other memory location of data, and/or any combination of the above.

With continued reference to FIG. 1, in some embodiments, data collection 112 may include a vector. As used in this disclosure, a "vector" is a data structure that represents one or more quantitative values and/or measures of data collection 112. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent, for instance as measured using cosine similarity as computed using a dot product of two vectors; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes.

With continued reference to FIG. 1, in some embodiments, data collection 112 may include a dictionary. As used in this disclosure, a "dictionary" is a data structure containing an unordered set of key value pairs. In this disclosure, a "key value pair" is a data representation of a data element such as, without limitation, data object 120. In some cases, dictionary may be an associative memory, or associative arrays, or the like thereof. In a non-limiting example, dictionary may be a hash table. In an embodiment, kay value pair may include a unique key, wherein the unique kay may associate with one or more values. In another embodiment, key value pair may include a value, wherein the value may associate with a single key. In some cases, each key value pair of set of key value pairs in dictionary may be separated by a separator, wherein the separator is an element for separating two key value pairs. In a non-limiting example, separator may be a comma in between each key value pairs of plurality of key value pairs within dictionary. In another non-limiting example, a dictionary may be expressed as "{first key value pair, second key value pair}," wherein the first key value pair and the second key value pair may be separate by a comma separator, and wherein both first key value pair and second key value pair may be expressed as "first/second key: first/second value." In a further non-limiting example, data collection 112 may be present as a dictionary: "{1: A, 2: B, 3: C}," wherein A may be a first user related data correspond to a first data object, B may be a second user related data correspond to a second data object, and C may be a third user related data correspond to a third data object. Data object 120 may include any kind of information related to the user such as, without limitation, NFT owner's personal information, financial information, health information, and the like thereof. Additionally, or alternatively, dictionary may include a term index, wherein the term index is a data structure to facilitate fast lookup of data object 120 in data collection 112 (i.e., index). In some cases, without limitation, term index may use a zero-based indexing, wherein the zero-based indexing may configure dictionary to start with index 0. In some cases, without limitation, term index may use a one-based indexing, wherein the one-based indexing may configure dictionary to start with index 1. In other cases, without limitation, term index may use a n-based indexing, wherein the n-based indexing may configure dictionary to start with any index from 0 to n. Further, term index may be determined/calculated using one or more hash algorithms. Hash algorithms may be any hash algorithm described above in this disclosure. In a non-limiting example, data collection may be present as a dictionary containing a plurality of hashes, wherein each hash of plurality of hashes represents a single data object. Hash may be any cryptographic hash as described above in this disclosure.

With continued reference to FIG. 1, in some embodiments, data collection 112 may be present as any other data structure such as, without limitation, tuple, single dimension array, multi-dimension array, list, linked list, queue, set, stack, dequeue, stream, map, graph, tree, and the like thereof. In some embodiments, data collection 112 may be present as a combination of more than one above data structures. In a non-limiting example, data collection 112 may be a dictionary of lists. As will be appreciated by persons having ordinary skill in the art, after having read the entirety of this disclosure, the foregoing list is provided by way of example and other data structures can be added as an extension or improvements of apparatus 100 disclosed herein. In some embodiments, without limitation, data collection 112 may be an immutable data collection, wherein the immutable data collection is a data collection that cannot be changed, modified, and/or updated once the data collection is received. In other embodiments, without limitation, data collection 112 may be a mutable data collection, wherein the mutable data collection is a data collection that can be changed, modified, and/or updated once the data collection is received.

Still referring to FIG. 1, in some embodiments, apparatus 100 may include a web crawler configured to automatically search and collect information related to a user for credential generation purposes. A "web crawler," as used herein, is a program that systematically browses the internet for the purpose of web indexing. The web crawler may be seeded with platform URLs, wherein the crawler may then visit the next related URL, retrieve the content, index the content, and/or measures the relevance of the content to the topic of interest. In one embodiment, the web crawler may be configured to scrape attribute datum 124 from user related social media and networking platforms. The web crawler may be trained with information received from a user through a user interface. A "user interface," as used in this disclosure, is a means by which the user and a computer system interact, including the use of input devices and software. For example, a user may input into a user interface, social media platforms they have accounts on and would like to retrieve user data from. A user interface may include a graphical user interface (GUI), command line interface (CLI), menu-driven user interface, touch user interface, voice user interface (VUI), form-based user interface, and the like. Processor 104 may receive at least an attribute datum 124 including information such as a user's name, pictures, user's profile, platform handles, platforms associated with the user, whether the user's account is verified by a "blue check" mark and the like. In some embodiments, a web crawler may be configured to generate a web query. A web query may include search criteria. Search criteria may include photos, videos, audio, user account handles, web page addresses and the like received from the user. A web crawler function may be configured to search for and/or detect one or more data patterns. A "data pattern" as used in this disclosure is any repeating forms of information. A data pattern may include, but is not limited to, features, phrases, and the like as described further below in this disclosure. The web crawler may work in tandem with any machine-learning model, digital processing technique utilized by processor 104, and the like as described in this disclosure. In some embodiments, a web crawler may be configured to determine the relevancy of a data pattern. Relevancy may be determined by a relevancy score. A relevancy score may be automatically generated by processor 104, received from a machine learning model, and/or received from the user. In some embodiments, a relevancy score may include a range of numerical values that may correspond to a relevancy strength of data received from a web crawler function. As a non-limiting example, a web crawler function may search the Internet for photographs of the user based on pictures and/or photo identification received from the user. The web crawler may return data results of photos of the user and the like. In some embodiments, the computing device may determine a relevancy score of each photograph retrieved by the web crawler.

Still referring to FIG. 1, processor 104 is configured to parse data collection 112 using a credential validation module 128 to identify and extract the at least the attribute datum 124 associated with a user. Parsed information may be provided, without limitation, to a credential validation module 128. A "credential validation module," as used in this disclosure, is a software and/or hardware module configured to validate user attributes and/or information associated with an NFT user. Credential validation module is described for exemplary purposes only; for example, "module" should not be construed to mean that the software code and/or hardware circuitry is embodied in a discrete set of code and/or circuitry independent of other software code. Rather, the term "module" is used herein merely as a convenient way to refer to the underlying functionality. In one embodiment, credential validation module 128 may be configured to extract the at least an attribute datum 124 from data collection 112. In one embodiment, credential validation module 128 may be configured to extract one or more words from one or more attribute datum 124. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data. Textual data may be parsed into tokens, which may include a simple word (sequence of letters separated by whitespace) or more generally a sequence of characters. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, credential validation module 128 may include a natural language process classification model that enumerates and/or derives statistical relationships between input term and output terms. Algorithm to generate the natural language process classification model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted word category related to at least an attribute datum 124 associated with a validated credential class 144 such as a legal identity, a social identity, a financial identity, proof of creation, proof of interaction, and/or proof of personhood. In some embodiments, there may be a finite number of categories to which an extracted word may pertain; an HMM inference algorithm, such as the forward-backward algorithm or the Viterbi algorithm, may be used to estimate the most likely discrete state given a word or sequence of words. Credential validation module 128 may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating the natural language process classification model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

With continued reference to FIG. 1, processor 104 is configured to classify data collection 112 to at least a credential datum 140 as a function of attribute datum 124 using credential validation module 128. A "credential datum," as used in this disclosure, is a datum relating to a user's digital assertion, qualification, and/or suitability based on attributes associated with the user. In some embodiments, credential datum 140 may include classes of one or more validated attribute datum such as legal identity, social identity, financial identity, proof of creation, proof of interaction, proof of personhood and the like. For instance, in a non-limiting example, credential datum 140 may include classified information associated with a user's real name, date of birth, home address, government ID, social security number, membership associated with a social media platform and/or a decentralized community, user profile, personal assets, income, expense, debts, proof of ownership of an NFT project, proof of creation of an NFT, prior transactions and/or interactions with other users of a decentralized community, education, personal experience, health records, trustworthiness, propensity, characteristics, social reputation, and the like. In some embodiments, a credential machine-learning model 136 may be utilized to classify data collection 112 including at least an attribute datum 124, wherein credential machine-learning model 136 may be configured to correlate the at least an attribute datum 124 to a validated credential class 144. A "machine-learning model," as used in this disclosure, is a process that automatedly uses training data to generate an algorithm and/or model performed by processor 104 to produce outputs given data provided as inputs, for instance and without limitation as described in further detail below. This is in contrast to a non-machine learning software program where the commands to be executed are determined in advance by a user and written in a programming language. A "validated credential class," as used in this disclosure, is a set of credentials categorized as legal identity class, social identity class, financial identity class, proof of creation class, proof of interaction class, proof of personhood class, or the like based on similar and/or common attribute datums collected from a user. For instance, in a non-limiting example, validated credential class 144 may be based on legal identity of a user including a user's name, date of birth, social security number, and the like. In another non-limiting example, validated credential class 144 may be based on proof of interaction including prior delegated user role associated with an NFT transaction, interactions with other NFT users, and the like. In yet another non-limiting example, validated credential class 144 may be based on proof of personhood including a user's reputation, trustworthiness, characteristics, and the like.

Still referring to FIG. 1, credential validation module 128 may employ a blockchain verification process to verify attribute datum 124 with information associated with prior NFT transactions of which the user was actively involved in. A "blockchain," as used in this disclosure, is an incorruptible digital leger that can be used to securely record transactions of an NFT. Anything that is written to the blockchain can't be altered in the future by any party. Blockchains act as decentralized ledgers with multiple nodes in a network and they are continuous chains starting from a genesis block up to the current block. Blockchain verification is a consensus mechanism-based process. During the process of creating a new block, the transactions associated with the NFT are hashed and a unique output or result is created. A hash function, takes input, and produces a specific output of a fixed size. It acts as a digital fingerprint which cannot be modified. The successive block in the chain contains a hash of the previous block and each block refers to its predecessor block for authentication and verification purposes. The transactions in a blockchain are referred to by their hash. For verification of prior NFT transactions, all nodes of the network must receive the same output by running the hash. Otherwise, the transactions are not verified. Once the prior NFT transactions are verified, credential validation module 128 may generate a credential datum 140. In one embodiment, credential datum 140 may provide a QR code that can be scanned using a QR reader on an electronic device to grant access to the verified prior NFT transactions associated with the user who requested the generation of a credential.

Continuing to refer to FIG. 1, in some embodiments, credential machine-learning model may include a classifier configured to correlate attribute datum 124 to a credential datum 140. A "classifier," as used in this disclosure is a machine-learning model, such as a mathematical model, neural net, or program generated by a machine learning algorithm known as "classification algorithm," as described in further detail below, that parses inputs into categories or bins of data, outputting the categories or bins of data and/or labels associated therewith. For instance, in a non-limiting example, a classifier may be trained to correlate a user's NFT trading history to a validated credential class of proof of transaction based on credential training data 132 that correlates different attributes to known credential classes associated with the attributes. In some embodiments, an NFT collector whose NFT trading history including buying and selling of NFTs backed by collectibles such as digital art pieces may be identified as having attributes correlated to proof of transactions in order to automatedly generate verifiable credential associated with the NFT collector as a user. Processor 104 and/or another device may generate a classifier using a classification algorithm, defined as a process whereby a processor derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a further non-limiting example, classification may be performed using a neural network classifier such as without limitation a convolutional neural network-based classifier. A convolutional neural network is a neural network in which at least one hidden layer is a convolutional layer that convolves inputs to that layer with a subset of inputs known as a "kernel," along with one or more additional layers such as pooling layers, fully connected layers, and the like.

Continuing to refer to FIG. 1, in some embodiments, credential machine-learning model 136 may be trained using credential training data 132, wherein credential training data 132 may comprise a plurality of data entries correlating attribute data to validated credential classes. Training data, which may include any training data as described in further detail below, is data including correlations and/or examples usable by a machine learning algorithm to generate machine-learning models and/or to be operated on by a lazy learning algorithm as described below. In some embodiments, training data may be obtained by processor 104 in any manner and/or form as described anywhere in this disclosure, including and without limitation retrieving from data store 120 such as, without limitation, a database. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, in some embodiments, data store 120 may be a blockchain storage. In some embodiments, blockchain storage may be a decentralized data store. In a non-limiting example, blockchain storage may be configured to save data such as, without limitation, data collection 112 in a decentralized network, wherein the decentralized network may distribute data collection 112 and/or data collection processing across multiple devices. Data collection processing may include any processing step described in this disclosure. In some embodiments, blockchain storage may be configured to process data collection 112 through a sharding process, wherein the sharding process is a data store partitioning that separates into a plurality of smaller data stores known as data store shards. As used in this disclosure, a "data store shard" is a horizontal/vertical partition of data such as, without limitation, data collection 112 in a data store that hold on a separate instance of the data store. Each shard may be copied to prevent data loss. Additionally, or alternatively, data collection 112 may be encrypted with private key. Private key may be any encryption key described above in this disclosure. Encryption of data collection 112 may include any processing steps described anywhere in this disclosure.

With continued reference to FIG. 1, in some embodiments, data store 120 may be a web storage, wherein the web storage is a data store for storing user-side data such as, without limitation, data collection 112. In a non-limiting example, web storage may be configured to store a user's legal identity such as the user's name, date of birth, social security number, address, photo ID, and the like. In some embodiments, without limitation, web storage may include a local storage, wherein the local storage is a web storage that store data collection 112 with no expiration date. In other embodiments, without limitation, web storage may include a session storage, wherein the session storage is a web storage that stores data collection 112 for a session, wherein the session is a time-delimited two-way link between two or more devices or ends. Data collection 112 may be stored in a session storage during any processing step described in this disclosure.

Still referring to FIG. 1, processor 104 is configured to generate a verifiable credential 148 as a function of the at least a credential datum 140. A "verifiable credential," as used in this disclosure, is a digital assertion generated based on credential datum 140 and/or validated credential class 144. For instance, in a non-limiting example, verifiable credential 148 may include qualification to access exclusive experience. In one embodiment, verifiable credential 148 may include a designated access level and/or a timeframe associated with the designated access level. An "access level," as used in this disclosure, is a degree of privilege assigned to a user with a corresponding credential in order to access specific venues, communities, experiences, items in the metaverse and/or in reality. For instance, in a non-limiting example, validated credential class 144 based on social identity as a member of a decentralized community may include an access level to member-only auction events and/or auction items such as NFTs backed by collectibles. In another non-limiting example, the access level may include discount fees for generating a smart contract associated with a credential to prevent smart contract overflow. A "timeframe," as used in this disclosure, is a specific period of time in which an event associated with an access level may occur. For instance, in a non-limiting example, validated credential class 144 based on social identity as a member of a decentralized community may include access to the member-only auction event and a timeframe associated with the beginning and the end of the auction event. In some embodiments, the timeframe may have a time limit associated with verifiable credential 148. Time limit may be calculated from an initial time, which may be a datum linked to a particular timestamp or other value representing a fixed moment in time, associated with verifiable credential 148; initial time may be a time of creation, a time of verification, or other significant time relating to a validity of verifiable credential 148. In one embodiment, initial time may be a time of creation of verifiable credential 148 in the form of a time-varying token. Initial time may include, without limitation, a timestamp, which may include a secure timestamp, and/or a datum linked to a secure timestamp, such as a cryptographic hash of the secure timestamp or the like. A "secure timestamp," as used in this disclosure, is an element of data that immutably and verifiably records a particular time, for instance by incorporating a secure proof, cryptographic hash, or other process whereby a party that attempts to modify the timeframe and/or date of the secure timestamp will be unable to do so without the alteration being detected as fraudulent.

With continued reference to FIG. 1, in some embodiments, processor 104 may be configured to perform a trusted timeframe evaluation associated with verifiable credential 148. For instance, in a non-limiting example, secure proof may be generated using a secure timestamp. Generating the secure timestamp may include digitally signing the secure timestamp using any digital signature protocol as described above. In some embodiments, authenticity of received data signals is established by utilizing a chain of attestation via one or more attestation schemes. For instance, in a non-limiting example, authenticity is established by utilizing a chain of attestation via direct anonymous attestation (DAA) to verify that an attested time associated with the timeframe of verifiable credential 148 is authentic.

Still referring to FIG. 1, secure timestamp may record the current time in a hash chain. In one embodiment, a hash chain may include a series of hashes, each produced from a message containing a current time stamp (i.e., current at the moment the hash is created) and the previously created hash, which may be combined with one or more additional data; additional data may include a random number, which may be generated for instance using credential verification module 128. Additional data may include one or more additional data, including attribute data and/or metadata associated with an NFT, that are received by processor 104. Additional data may be hashed into a Merkle tree. It may be computationally infeasible to reverse hash any one entry, particularly in the amount of time during which its currency is important; it may be astronomically difficult to reverse hash the entire chain, rendering illegitimate or fraudulent timestamps referring to the hash chain all but impossible. A purported entry may be evaluated by hashing its corresponding message. In an embodiment, the trusted timestamping procedure utilized is substantially similar to the RFC 3161 standard. In this scenario, the received data signals are locally processed at the listener device by a one-way function, e.g. a hash function, and this hashed output data is sent to a timestamping authority (TSA). The use of secure timestamps as described herein may enable systems and methods as described herein to instantiate attested time. Attested time is the property that a device incorporating a local reference clock may hash data, such as the timeframe associated with the access level, along with the local timestamp of the device. Attested time may additionally incorporate attested credential, attested identity, attested device architecture and other pieces of information identifying properties of the attesting device. In one embodiment, secure timestamp is generated by a trusted third party (TTP) that appends a timestamp to the hashed output data, applies the TSA private key to sign the hashed output data concatenated to the timestamp, and returns this signed, a.k.a. trusted timestamped data back to the listener device. Alternatively, or additionally, one or more additional participants, such as other verifying nodes, may evaluate secure timestamp, or other party generating secure timestamp and/or perform threshold cryptography with a plurality of such parties, each of which may have performed an embodiment of method to produce a secure timestamp. In an embodiment, data store 120 or other parties authenticating digitally signed assertions, devices, and/or user credentials may perform authentication at least in part by evaluating timeliness of entry and/or generation data as assessed against secure timestamp. In an embodiment, secure proof is generated using an attested computing protocol; this may be performed, as a non-limiting example, using any protocol for attested computing as described above.

Still referring to FIG. 1, in some embodiments, processor 104 may utilize a decision tree for the designation of access level and/or timeframe associated with the designated access level as a function of data collection 112 including at least an attribute datum 124. In one embodiment, and without limitation, processor 104 may be configured to plug in one or more data collection 112 to a plurality of nodes of the decision tree. A plurality of access levels and/or timeframes associated with different types of validated credential classes 144 may be predetermined and/or manually labeled and plugged in a plurality of leaf nodes of the decision tree. For instance, prior correlations between a validated credential class 144 and an associated access level and/or timeframe may be included for the construction of the decision tree using a decision metric. As used in this disclosure, a "decision metric" is a quantitative measurement for determining one or more branches within the decision tree from a plurality of root nodes to a plurality of internal nodes. As used in this disclosure, a "branch" is a connection between two nodes of the decision tree. Nodes may include any node described above such as, without limitation, root node, terminal node, internal node, and the like thereof. In some embodiments, branch may include a relation indicator, wherein the relation indicator is an element indicates a single relationship between connected nodes. In some cases, relation indicator may include any data type such as, without limitation, string, integer, Boolean, object, and the like thereof. In a non-limiting example, a root node may be connected to a first terminal node through a first branch and a second terminal node through a second branch, wherein the first branch may include a first relation indicator of string "yes" and the second branch may include a second relation indicator of string "no." In some embodiments, decision metric may include an entropy, wherein the entropy is a measurement of randomness in data collection 112 and measures an amount of uncertainty within data collection 112. In a non-limiting example, the decision metric may include a higher or lower probability of correlation between attribute datum 124 associated with a validated credential class 144 and an access level and/or timeframe using training data such as prior designation of access level and/or timeframe based on a specific type of validated credential class. In one embodiment, prior designations between a validated credential class of social identity and the corresponding access level and/or timeframe are established based on attribute data showing membership of a user community, wherein unlimited access and a timeframe that equals the full length of a member-only event have been granted when a user credential is automatically generated. The prior designations are utilized for the determination of future inputs of attribute data where credentials generated based on membership are automatically granted unlimited access and a timeframe that equals the full length of a member-only event in accordance with the prior designations. A designated access level and/or timeframe may be assigned as part of the classification outcome. For instance, user who are able to submit attribute data associated with each and every validated credential class 144 may be assigned the highest access level, whereas users who provides merely a legal name may be assigned the lowest access level. As used in this disclosure, a "decision tree" is a data structure that represents and combines one or more determinations or other computations with respect to data provided thereto, as well as earlier such determinations or calculations, as nodes of a tree data structure where inputs of some nodes are connected to outputs of others. Plurality of nodes within the decision tree may have at least a "root node" which receives input from data collection 112 and a plurality of "leaf nodes" corresponding to an executed result of the decision tree. In other words, data collection 112 as a root node may be produced by the decision tree to output classifications and/or determinations of in the leaf nodes as discussed further below. In some embodiments, random forest may be used to avoid overfitting of the decision tree.

Continuing to refer to FIG. 1, in one embodiment, the owner of verifiable credential 148 may obtain a "blue check mark" or other marks showing a credential associated with the owner, indicating that the credential data is publicly available. In some embodiments, the owner of verifiable credential 148 may choose when and to which other parties verifiable credential 148 is presented. In some embodiments, a portion of verifiable credential 148 may be public and other portions of verifiable credential 148 may be hidden from the owner's community. However, in one embodiment, the hidden portion of verifiable credential 148 may still affect access rights such as an access level and timeframe associated with the access level.

In one embodiment, verifiable credential 148 may be a tokenized credential generated by a self-executable data structure. A "tokenized credential," as used in this disclosure, is an NFT backed by verifiable credentials associated with a user. In some embodiments, the tokenized verifiable credential 148 may be stored in an immutable sequential listing 152 on a decentralized platform 156. In one embodiment, the tokenized verifiable credential 148 may be an access NFT generated by a self-executable data structure. As used in this disclosure, a "self-executable data structure" is an algorithm, data structure, and/or record which automatically executes and controls legally relevant events and actions according to the terms of a contract. In some embodiments, certain aspects of generating a self-executable data structure are disclosed in U.S. patent application Ser. No. 17/984,678, filed on Nov. 10, 2022 titled "APPARATUS AND METHOD FOR GENERATING USER-SPECIFIC SELF-EXECUTING RECORDS," which is incorporated by reference herein in its entirety. In one embodiment, the self-executable data structure may be a self-executing record with the terms of the record between users being directly written into lines of code. The self-executable data structure may be configured to allow records and agreements to be carried out among disparate, anonymous user without the need for a central figure, legal system, or external enforcement. For example, processor 104 may be configured to generate a user credential using a self-executable data structure. Objectives of self-executable data structure may include reduction of need in trusted intermediaries, arbitrations and enforcement costs, fraud losses, as well as the reduction of malicious and accidental exceptions. A self-executable data structure, in one embodiment, may permit trusted transactions and agreements to be carried out among disparate, anonymous parties without the need for a central authority, legal system, or external enforcement mechanism. They may conform to various standards, such as ERC-721. A standard may provide functionalities for self-executable data structures. As a further non-limiting example, the self-executable data structure may contain and/or include in postings representations of one or more agreed upon actions and/or transactions to be performed. A self-executable data structure may contain and/or include payments to be performed, including "locked" payments that are automatically released to an address of a party upon performance of terms of contract. A self-executable data structure may contain and/or include in postings representations of items to be transferred, including without limitation, NFT or crypto currencies. Persons skilled in the art, upon reviewing the entirety of this disclosure, will be aware of the various embodiments and implementation of a self-executable data structure for purposes as described herein. A "decentralized platform," as used in this disclosure, is a platform or server that enables secure data exchange between anonymous parties. Decentralized platforms may be supported by any blockchain technologies. For example, and without limitation, blockchain-supported technologies can potentially facilitate decentralized coordination and alignment of human incentives on a scale that only top-down, command-and-control structures previously could. "Decentralization," as used in this disclosure, is the process of dispersing functions and power away from a central location or authority. In a non-limiting embodiment, decentralized platform can make it difficult if not impossible to discern a particular center. In some embodiments, decentralized platform can include a decentralized ecosystem. Decentralized platform may serve as an ecosystem for decentralized architectures such as an immutable sequential listing 152 and/or blockchain.

In a non-limiting embodiment, and still referring to FIG. 1, decentralized platform may implement Decentralized Finance (DeFi). "Decentralized finance," as used in this disclosure, is financial technology based on secure distributed ledgers similar. A decentralized finance architecture may include cryptocurrencies, software, and hardware that enables the development of applications. Defi offers financial instruments without relying on intermediaries such as brokerages, exchanges, or banks. Instead, it uses smart contracts on a blockchain. DeFi platforms allow people to lend or borrow funds from others, speculate on price movements on assets using derivatives, trade cryptocurrencies, insure against risks, and earn interest in savings-like accounts. In some embodiments, DeFi uses a layered architecture and highly composable building blocks. In some embodiments DeFi platforms may allow creators and/or owners to lend or borrow funds from others, trade cryptocurrencies and/or NFTs, insure against risks, and receive payments. In a non-limiting embodiment, Defi may eliminate intermediaries by allowing creators, owners, collectors, and/or brokers to conduct financial transactions through peer-to-peer financial networks that use security protocols, connectivity, software, and hardware advancements. In one embodiment, decentralized platform may implement Game Finance (GameFi). "Game Finance," as used in this disclosure, is blockchain technology including NFTs, cryptocurrencies and decentralization designed to advance virtual gaming environments where players can generate income from playing and sharing their gaming experience. In some embodiments, GameFi may power blockchain games where players are financially rewarded for the time and effort they put into playing, known as play-to-earn. Economic incentives may include tokens, upgrades, avatars, virtual land, and the like. GameFi may allow players to not only earn and collect in-platform assets, but also transfer them across different games and platforms, where user credential may hold the key to unlock new use cases. Persons skilled in the art, upon reviewing the entirety of this disclosure, will be aware of the various embodiments of implementing decentralized finance for purposes as described herein.

In a non-limiting embodiment, and still referring to FIG. 1, decentralized platform 156 may implement Web 3.0. Whereas Web 2.0 is a two-sided client-server architecture, with a business hosting an application and users (customers and advertisers), "Web 3.0," as used in this disclosure, is an idea or concept that decentralizes the architecture on open platforms. In some embodiments, decentralized platform may enable communication between a plurality of computing devices, wherein it is built on a back end of peer-to-peer, decentralized network of nodes, the applications run on decentralized storage systems rather than centralized servers. In some embodiments, these nodes may be comprised together to form a World Computer. A "World Computer," as used in this disclosure, is a group of computing devices that are capable of automatically executing smart contract programs on a decentralized network. A "decentralized network," as used in this disclosure, is a set of computing device sharing resources in which the architecture of the decentralized network distributes workloads among the computing devices instead of relying on a single central server. In a non-limiting embodiment, a decentralized network may include an open, peer-to-peer, Turing-complete, and/or global system. A World Computer and/or apparatus 100 may be communicatively connected to immutable sequential listing 152. Any digitally signed assertions onto immutable sequential listing 152 may be configured to be confirmed by the World Computer. Alternatively or additionally, apparatus 100 may be configured to store a copy of immutable sequential listing 152 into memory 108. This is so, at least in part, to process a digitally signed assertion that has a better chance of being confirmed by the World Computer prior to actual confirmation. In a non-limiting embodiment, decentralized platform may be configured to tolerate localized shutdowns or attacks; it is censorship-resistant. In another non-limiting embodiment decentralized platform and/or apparatus 100 may incorporate trusted computing. In a non-limiting example, because there is no one from whom permission is required to join the peer-to-peer network, as long as one operates according to the protocol; it is open-source, so its maintenance and integrity are shared across a network of engineers; and it is distributed, so there is no central server nor administrator from whom a large amount of value or information might be stolen. Persons skilled in the art, upon reviewing the entirety of this disclosure, will be aware of the various embodiments and functions of decentralized platform 156 for purposes as described herein.

With continued reference to FIG. 1, decentralized platform 156 may include a decentralized exchange platform. A "decentralized exchange platform," as is used in this disclosure, contains digital technology, which allows buyers and sellers of securities such as NFTs to deal directly with each other instead of meeting in a traditional exchange. In some embodiments, decentralized platform may include an NFT marketplace. An "NFT marketplace" is a marketplace allowing uses to trade NFTs and upload them to an address. Decentralized platform 156 may act as any NFT marketplace such as, but not limited to, OpenSea, Polygon, FCTONE, The Sandbox, CryptoKitties, Dentraland, Nifty Gateway, VEEFreinds, ROCKI, SuperRare, Enjin Marketplace, Rarible, WazirX, Portion, Zora, Mintable, PlayDapp, Aavegotchi, and the like thereof. Persons skilled in the art, upon reviewing the entirety of this disclosure, will be aware of the various embodiments of a marketplace.

Continuing to refer to FIG. 1, an "access NFT," as used in this disclosure, is an NFT defined by its utility to provide its holder access to specific communities, experiences, and items in the metaverse or in reality based on verifiable credential. For instance, in a non-limiting example, verifiable credential 148 may be a tokenized credential generated by a self-executable data structure and/or transaction protocol such as a smart contract for token-gated access to an NFT project community. In some embodiments, access NFT holders may gain access to a private discord server or other community area based on the access level and/or timeframe associated with the access NFT. For instance, a virtual concert organizer may issue a concert attendee an access NFT backed by the credential the concert attendee provided using a self-executable data structure including a smart contract in order to grant access to the concert for a predetermined timeframe that equals the length of the concert. In some embodiments, the access NFT may be stored in a block chain and may be linked to an attested time such as the entirety of the concert, or the like. In some embodiments, the data associated with verifiable credential 148 and/or the access NFT may be public. In other embodiments, the data associated with verifiable credential 148 and/or the access NFT may be private and/or hidden from other concert attendees and only the concert organizer may have access to the credential data associated with each individual concert attendee. In another embodiment, an NFT project owner may issue an access NFT to a user to offer the access NFT holder access to some exclusive form of content. Verifiable credential 148 may be a tokenized credential generated by a self-executable data structure and/or transaction protocol when a user purchases a membership of the NFT project. Verifiable credential 148 may act as a "blue check mark" for the user who purchased the membership. In some embodiments, processor 104 may be configured to limit access to verifiable credential 148 associated with the access NFT from a user community while maintain access rights associated with the access NFT.

Figure 2:
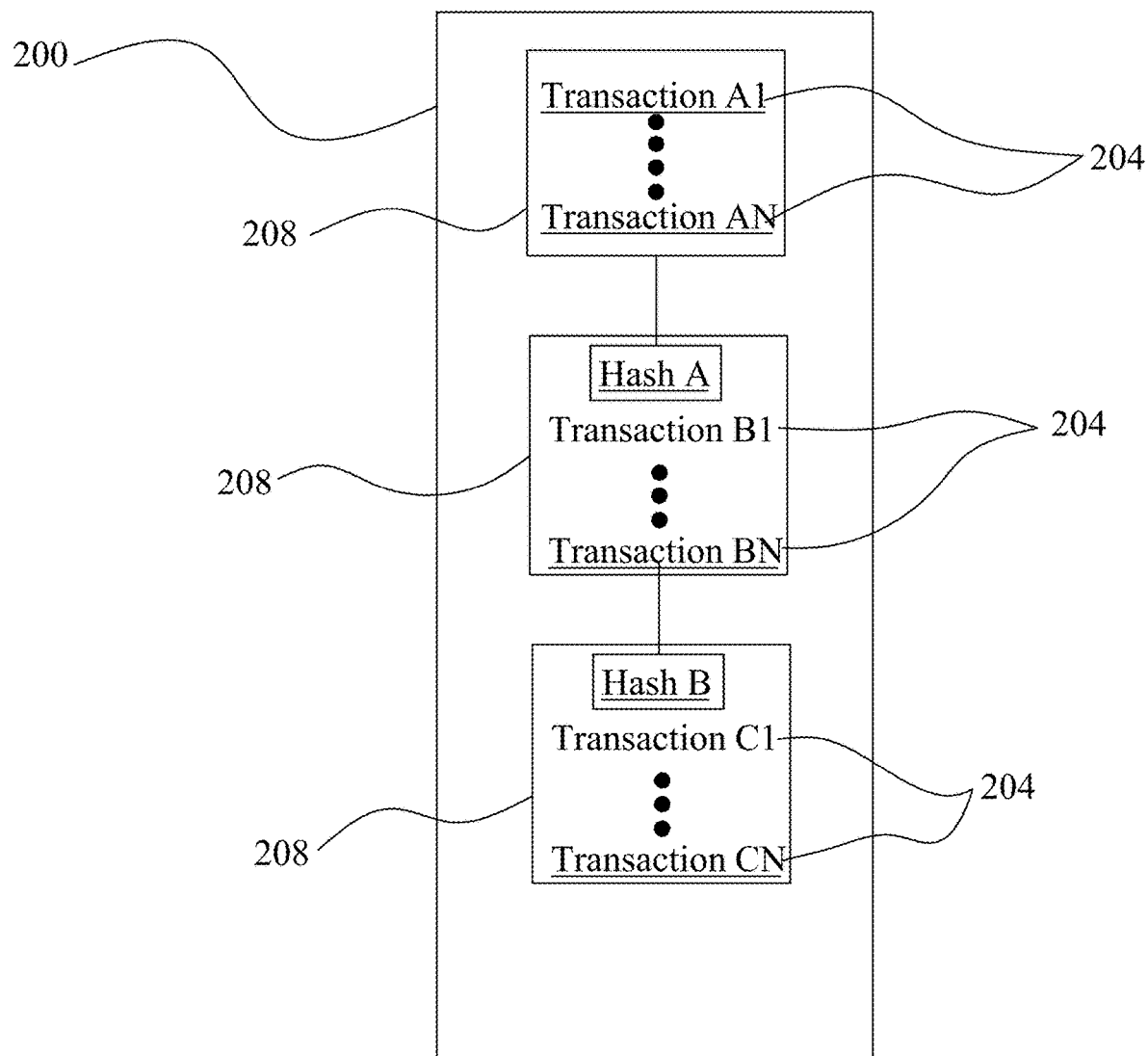
FIG. 2 is a block diagram of exemplary embodiment of an immutable sequential listing.

Referring now to FIG. 2, an exemplary embodiment of an immutable sequential listing 200 is illustrated. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing 200 may be, include and/or implement an immutable ledger, where data entries that have been posted to immutable sequential listing 200 cannot be altered. Data elements are listing in immutable sequential listing 200; data elements may include any form of data, including textual data, image data, encrypted data, cryptographically hashed data, and the like. Data elements may include, without limitation, one or more at least a digitally signed assertions. In one embodiment, a digitally signed assertion 204 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 204. In an embodiment, collection of textual data states that the owner of a certain transferable item represented in a digitally signed assertion 204 register is transferring that item to the owner of an address. A digitally signed assertion 204 may be signed by a digital signature created using the private key associated with the owner's public key, as described above.

Still referring to FIG. 2, a digitally signed assertion 204 may describe a transfer of a NFT and/or virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g., a ride share vehicle or any other asset. A digitally signed assertion 204 may describe the credential of a user in one embodiment. In another embodiment, digitally signed assertion 204 may describe the transfer of a physical good; for instance, a digitally signed assertion 204 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 204 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 2, in one embodiment, an address is a textual datum identifying the recipient of virtual currency or another item of value in a digitally signed assertion 204. In some embodiments, address is linked to a public key, the corresponding private key of which is owned by the recipient of a digitally signed assertion 204. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 204 may record a subsequent a digitally signed assertion 204 transferring some or all of the value transferred in the first a digitally signed assertion 204 to a new address in the same manner. A digitally signed assertion 204 may contain textual information that is not a transfer of some item of value in addition to, or as an alternative to, such a transfer. For instance, as described in further detail below, a digitally signed assertion 204 may indicate a confidence level associated with a distributed storage node as described in further detail below.

In an embodiment, and still referring to FIG. 2 immutable sequential listing 200 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 200 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 2, immutable sequential listing 200 may preserve the order in which the at least a posted content took place by listing them in chronological order; alternatively or additionally, immutable sequential listing 200 may organize digitally signed assertions 204 into sub-listings 208 such as "blocks" in a blockchain, which may be themselves collected in a temporally sequential order; digitally signed assertions 204 within a sub-listing 208 may or may not be temporally sequential. The ledger may preserve the order in which at least a posted content took place by listing them in sub-listings 208 and placing the sub-listings 208 in chronological order. Immutable sequential listing 200 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 200 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 2, immutable sequential listing 200, once formed, may be inalterable by any party, no matter what access rights that party possesses. For instance, immutable sequential listing 200 may include a hash chain, in which data is added during a successive hashing process to ensure non-repudiation. Immutable sequential listing 200 may include a block chain. In one embodiment, a block chain is immutable sequential listing 200 that records one or more new at least a posted content in a data item known as a sub-listing 208 or "block." An example of a block chain is the BITCOIN block chain used to record BITCOIN transactions and values. Sub-listings 208 may be created in a way that places the sub-listings 208 in chronological order and link each sub-listing 208 to a previous sub-listing 208 in the chronological order so that any computing device may traverse the sub-listings 208 in reverse chronological order to verify any at least a posted content listed in the block chain. Each new sub-listing 208 may be required to contain a cryptographic hash describing the previous sub-listing 208. In some embodiments, the block chain contains a single first sub-listing 208 sometimes known as a "genesis block."

Still referring to FIG. 2, the creation of a new sub-listing 208 may be computationally expensive; for instance, the creation of a new sub-listing 208 may be designed by a "proof of work" protocol accepted by all participants in forming immutable sequential listing 200 to take a powerful set of computing devices a certain period of time to produce. Where one sub-listing 208 takes less time for a given set of computing devices to produce the sub-listing 208 protocol may adjust the algorithm to produce the next sub-listing 208 so that it will require more steps; where one sub-listing 208 takes more time for a given set of computing devices to produce the sub-listing 208 protocol may adjust the algorithm to produce the next sub-listing 208 so that it will require fewer steps. As an example, protocol may require a new sub-listing 208 to contain a cryptographic hash describing its contents; the cryptographic hash may be required to satisfy a mathematical condition, achieved by having the sub-listing 208 contain a number, called a nonce, whose value is determined after the fact by the discovery of the hash that satisfies the mathematical condition. Continuing the example, the protocol may be able to adjust the mathematical condition so that the discovery of the hash describing a sub-listing 208 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 208 according to the protocol is known as "mining." The creation of a new sub-listing 208 may be designed by a "proof of stake" protocol as will be apparent to those skilled in the art upon reviewing the entirety of this disclosure.

Continuing to refer to FIG. 2, in some embodiments, protocol also creates an incentive to mine new sub-listings 208. The incentive may be financial; for instance, successfully mining a new sub-listing 208 may result in the person or entity that mines the sub-listing 208 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 208. Each sub-listing 208 created in immutable sequential listing 200 may contain a record or at least a posted content describing one or more addresses that receive an incentive, such as virtual currency, as the result of successfully mining the sub-listing 208.

With continued reference to FIG. 2, where two entities simultaneously create new sub-listings 208, immutable sequential listing 200 may develop a fork; protocol may determine which of the two alternate branches in the fork is the valid new portion of the immutable sequential listing 200 by evaluating, after a certain amount of time has passed, which branch is longer. "Length" may be measured according to the number of sub-listings 208 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 208 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 200 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in immutable sequential listing 200.

Still referring to FIG. 2, additional data linked to at least a posted content may be incorporated in sub-listings 208 in immutable sequential listing 200; for instance, data may be incorporated in one or more fields recognized by block chain protocols that permit a person or computer forming a at least a posted content to insert additional data in immutable sequential listing 200. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 2, in some embodiments, virtual currency is traded as a crypto currency. In one embodiment, a crypto currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto currency may be centralized, with its protocols enforced or hosted by a particular entity. For instance, crypto currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 208 in a block chain computationally challenging; the incentive for producing sub-listings 208 may include the grant of new crypto currency to the miners. Quantities of crypto currency may be exchanged using at least a posted content as described above.

Figure 3:
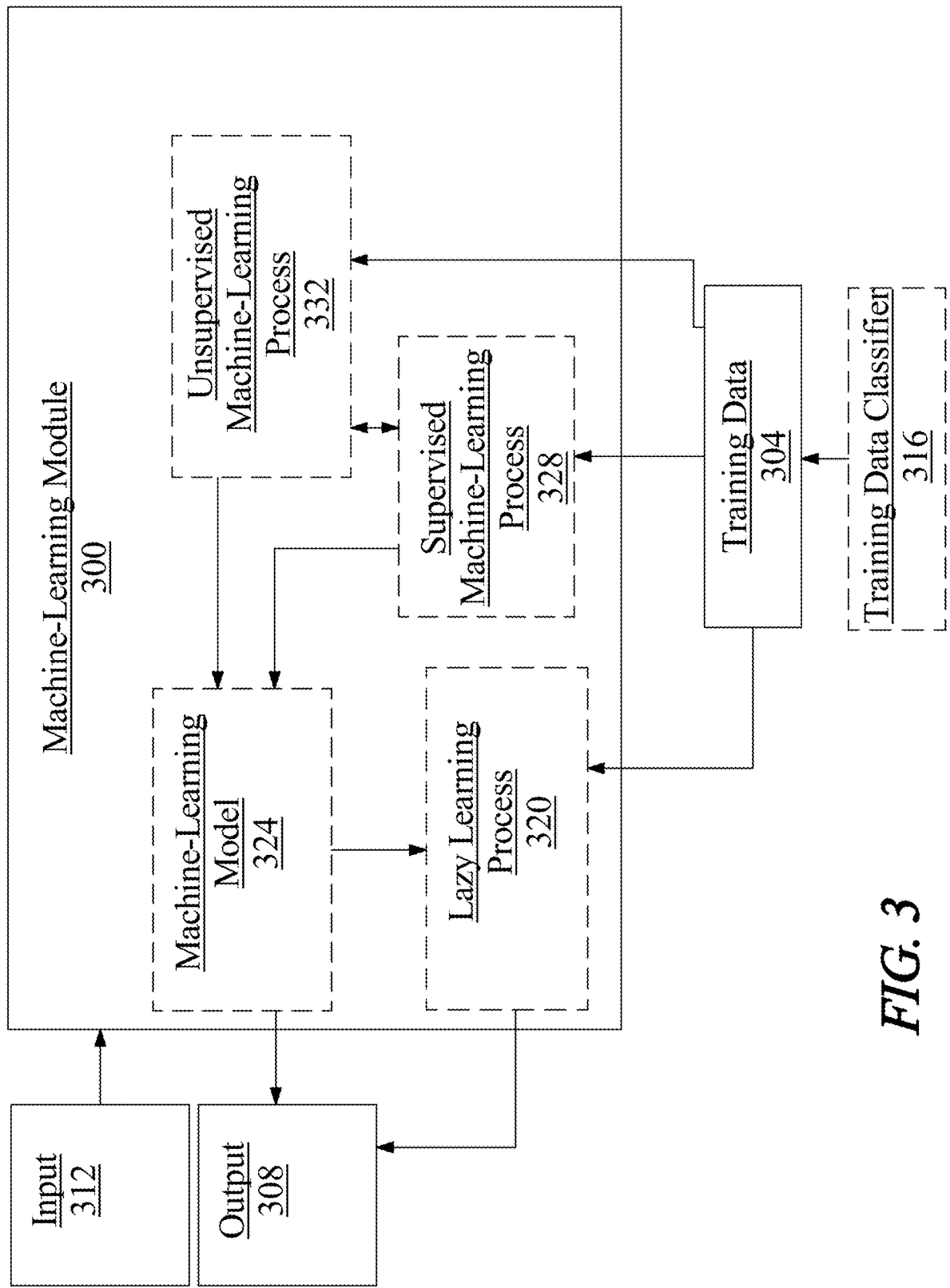
FIG. 3 is a block diagram of exemplary embodiment of a machine learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network including an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating several inputs to outputs, and seek to find one or more mathematical relations relating inputs to outputs, where each of the one or more mathematical relations is optimal according to some criterion specified to the algorithm using some scoring function. For instance, a supervised learning algorithm may include inputs and outputs described through this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of one divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 4:
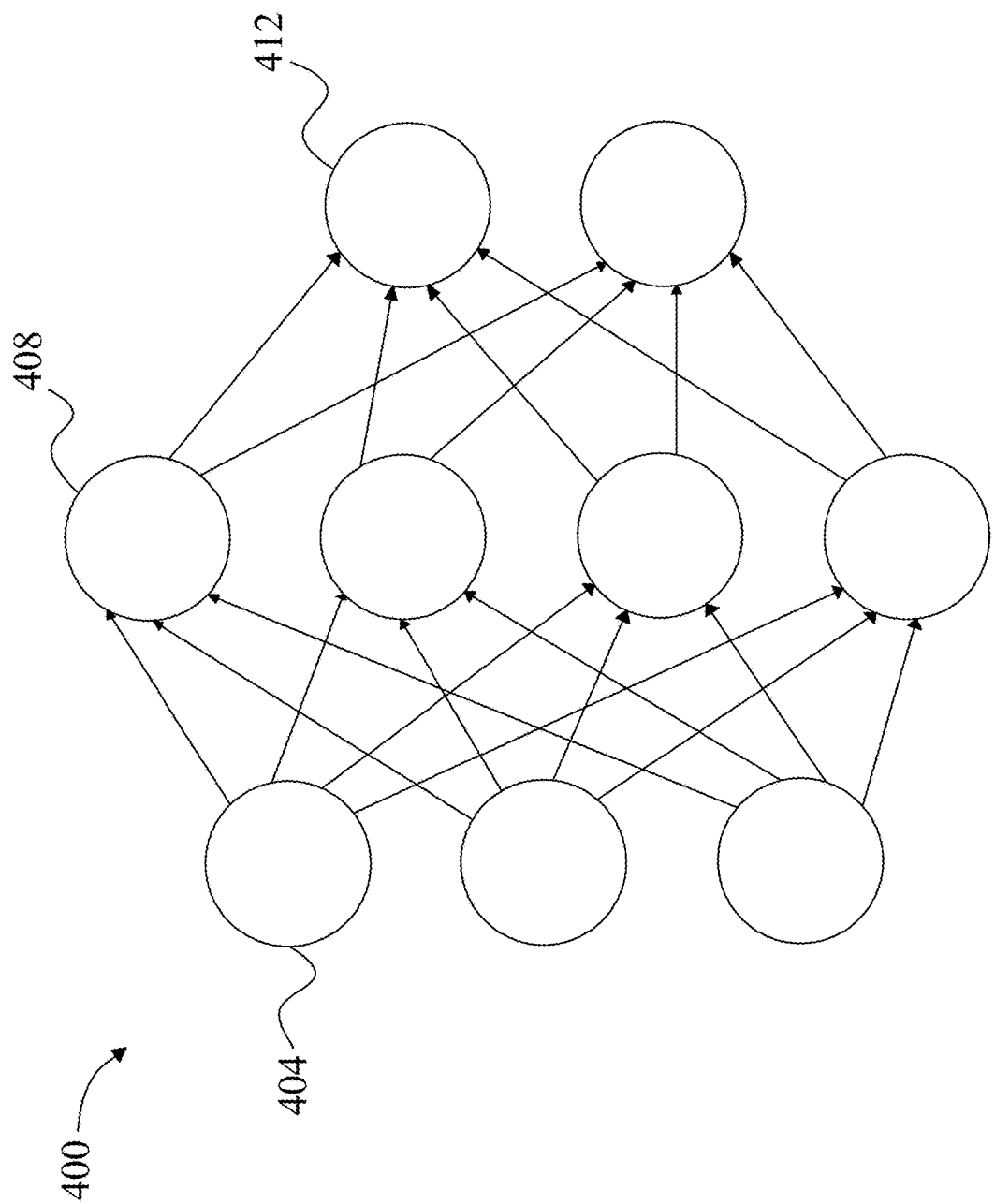
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 5:
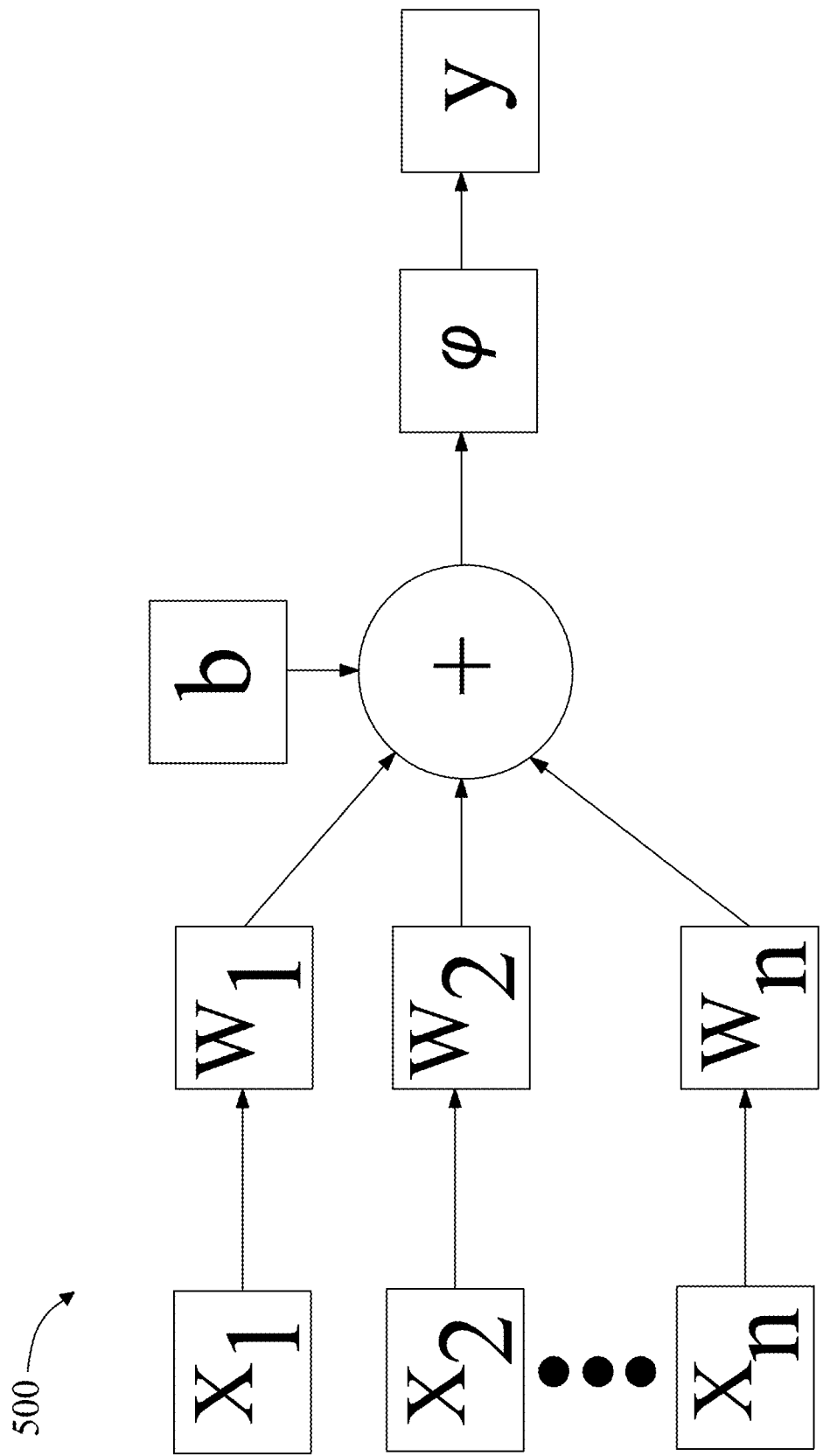
FIG. 5 is a block diagram of an exemplary embodiment of a node of a neural network.

Referring now to FIG. 5, an exemplary embodiment of a node of a neural network is illustrated. A node may include, without limitation a plurality of inputs xi that may receive numerical values from inputs to a neural network containing the node and/or from other nodes. Node may perform a weighted sum of inputs using weights w', that are multiplied by respective inputs xi. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input x, may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
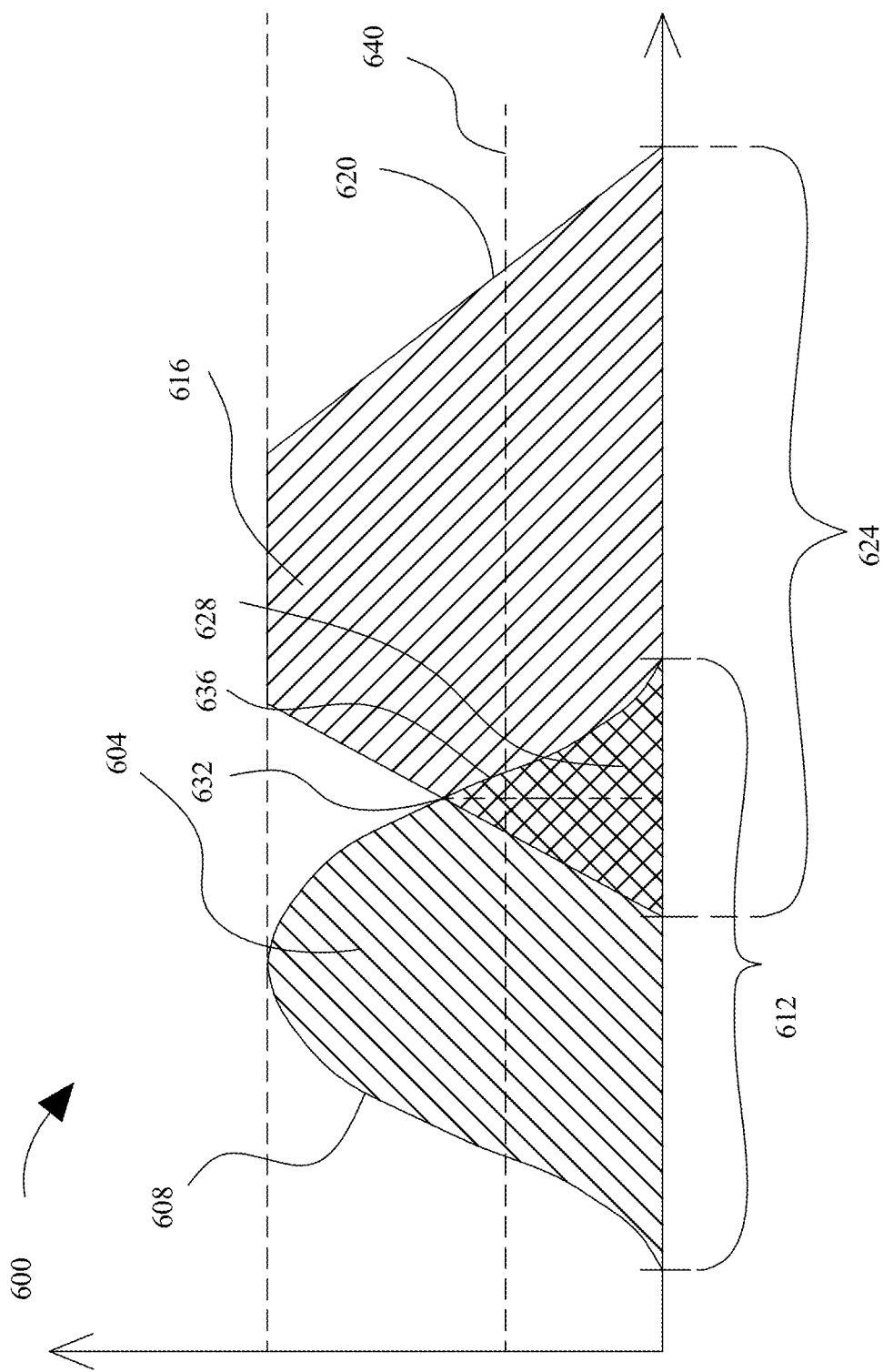
FIG. 6 is a block diagram of a fuzzy set system.

Referring now to FIG. 6, an exemplary embodiment of fuzzy set comparison 600 is illustrated. A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \le x < b \\ \frac{c-x}{c-b}, & \text{if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 6, first fuzzy set 604 may represent any value or combination of values as described above, including output from one or more machine-learning models and an attribute datum 124 such as a user's legal name, date of birth, social security number, social media membership, photo ID, assets, debts, income, NFT ownership, NFT transactions, health records, reputation, propensity, characteristics, and the like, and a predetermined class, such as without limitation a validated credential class 144 such as a user's legal identity, social identity, financial identity, proof of creation, proof of interaction, and proof of personhood, and the like, for combination to occur as described above. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 628 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, threshold may indicate a sufficient degree of overlap between an output from one or more machine-learning models and/or an attribute datum 124 such as a user's legal name, date of birth, social security number, social media membership, photo ID, assets, debts, income, NFT ownership, NFT transactions, health records, reputation, propensity, characteristics, and the like, and a predetermined class, such as without limitation a validated credential class 144 such as a user's legal identity, social identity, financial identity, proof of creation, proof of interaction, and proof of personhood, and the like, for combination to occur as described above. Alternatively or additionally, each threshold may be tuned by a machine-learning and/or statistical process, for instance and without limitation as described in further detail below.

Further referring to FIG. 6, in an embodiment, a degree of match between fuzzy sets may be used to classify attribute datum 124 with credential datum 140. For instance, if an attribute datum such as a legal name has a fuzzy set matching credential datum 140 fuzzy set by having a degree of overlap exceeding a threshold, processor 104 may classify the legal name as a legal identity. Where multiple fuzzy matches are performed, degrees of match for each respective fuzzy set may be computed and aggregated through, for instance, addition, averaging, or the like, to determine an overall degree of match.

Still referring to FIG. 6, in an embodiment, attribute datum 124 may be compared to multiple credential datum 140 fuzzy sets. For instance, a prior NFT transaction associated with a user who requested the generation of a credential may be represented by a fuzzy set that is compared to each of the multiple credential datum fuzzy sets; and a degree of overlap exceeding a threshold between the prior NFT transaction fuzzy set and any of the multiple credential datum 140 fuzzy sets may cause processor 104 to classify the prior NFT transaction as belonging to proof of interaction. Machine-learning methods as described throughout may, in a non-limiting example, generate coefficients used in fuzzy set equations as described above, such as without limitation x, c, and σ of a Gaussian set as described above, as outputs of machine-learning methods. Likewise, attribute datum 124 may be used indirectly to determine a fuzzy set, as an attribute datum fuzzy set may be derived from outputs of one or more machine-learning models that take the attribute datum fuzzy set directly or indirectly as inputs.

Figure 7:
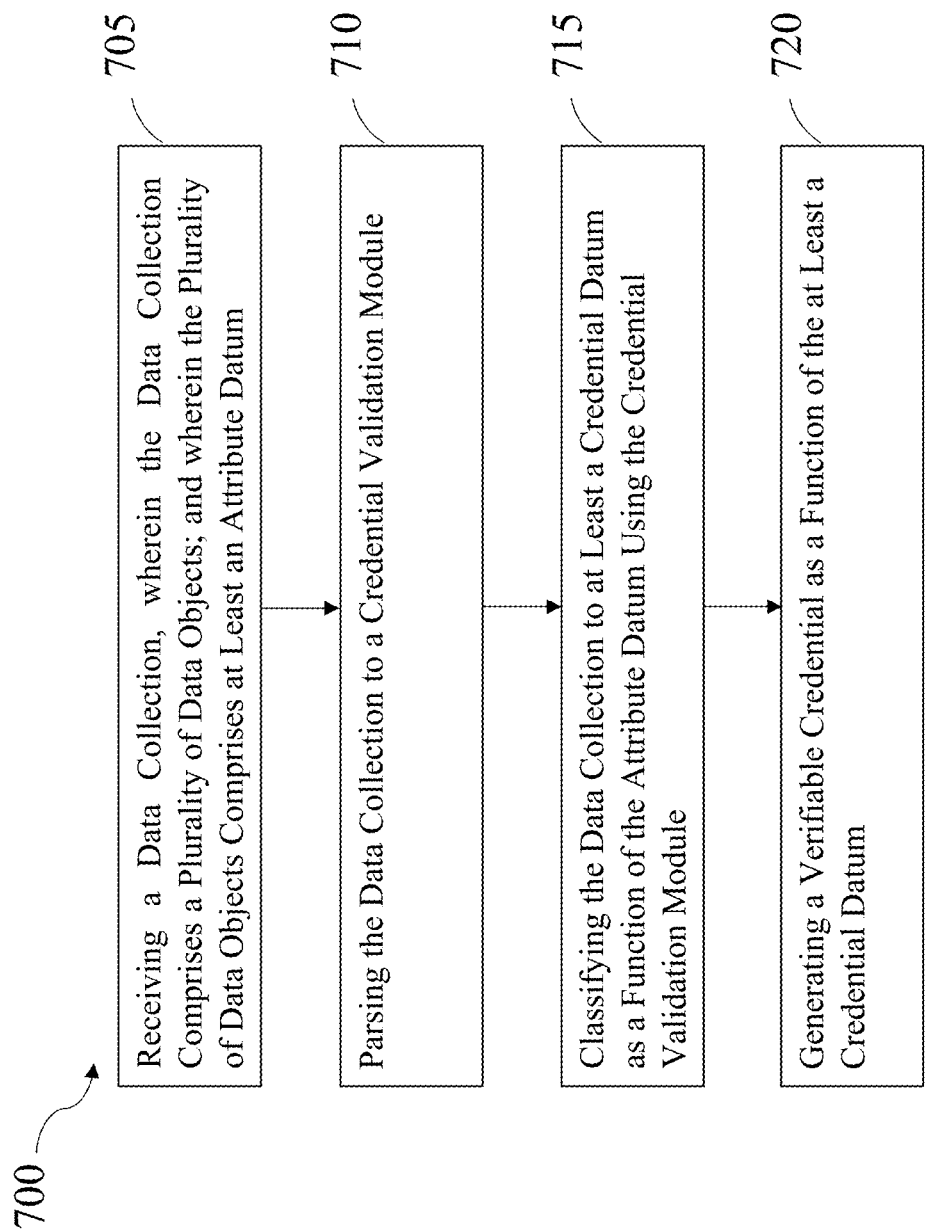
FIG. 7 is a flow diagram illustrating a method for automated credential generation.

Referring now to FIG. 7, a flow diagram of an exemplary method 700 for automated credential generation is illustrated. At step 705, method 700 includes receiving, by at least a processor, a data collection, wherein the data collection comprises a plurality of data objects; and wherein the plurality of data objects includes at least an attribute datum. In some embodiments, data collection may include attribute datum such as a user's legal name, date of birth, social security number, social media membership, photo ID, assets, debts, income, NFT ownership, NFT transactions, health records, reputation, propensity, characteristics, and the like, some attribute data may be selected from the group consisting of the user's legal identity, social identity, financial identity, proof of creation, proof of interaction, and proof of personhood, and the like. In some embodiments, a web crawler may be configured to automatically search and collect information related to a user for credential generation purposes. This may be implemented as described and with reference to FIGS. 1-6.

Still referring to FIG. 7, at step 710, method 700 includes parsing, by the at least a processor, the data collection to a credential validation module. In one embodiment, the credential validation module may be configured to extract the at least an attribute datum from the data collection. In one embodiment, the credential validation module may be configured to extract one or more words from one or more attribute datum. In one embodiment, credential validation module may include a natural language process classification model that enumerates and/or derives statistical relationships between input term and output terms. This may be implemented as described and with reference to FIGS. 1-6.

Continuing to refer to FIG. 7, at step 715, method 700 includes classifying, by the at least a processor, the data collection to at least a credential datum as a function of the attribute datum suing the credential validation module. In some embodiment, credential datum may include classes of one or more validated attribute datum such as legal identity, social identity, financial identity, proof of creation, proof of interaction, proof of personhood and the like. In some embodiments, a credential machine-learning model may be utilized to classify data collection including at least an attribute datum, wherein the credential machine-learning model may be configured to correlate the at least an attribute datum to a validated credential class. This may be implemented as described and with reference to FIGS. 1-6.

Still referring to FIG. 7, at step 720, method 700 includes generating, by the at least a processor, a verifiable credential as a function of the at least a credential datum. In one embodiment, the verifiable credential may include a token representing validation of a user. In one embodiment, the verifiable credential may include a token representing an access level associated with the user. In one embodiment, the verifiable credential may include a timeframe for the access level associated with the user. In some embodiments, the verifiable credential may be a tokenized credential generated by a self-executable data structure such as a smart contract, wherein the tokenized verifiable credential may be stored in an immutable sequential listing on a decentralized platform. This may be implemented as described and with reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, and the like.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, and the like.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, and the like.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
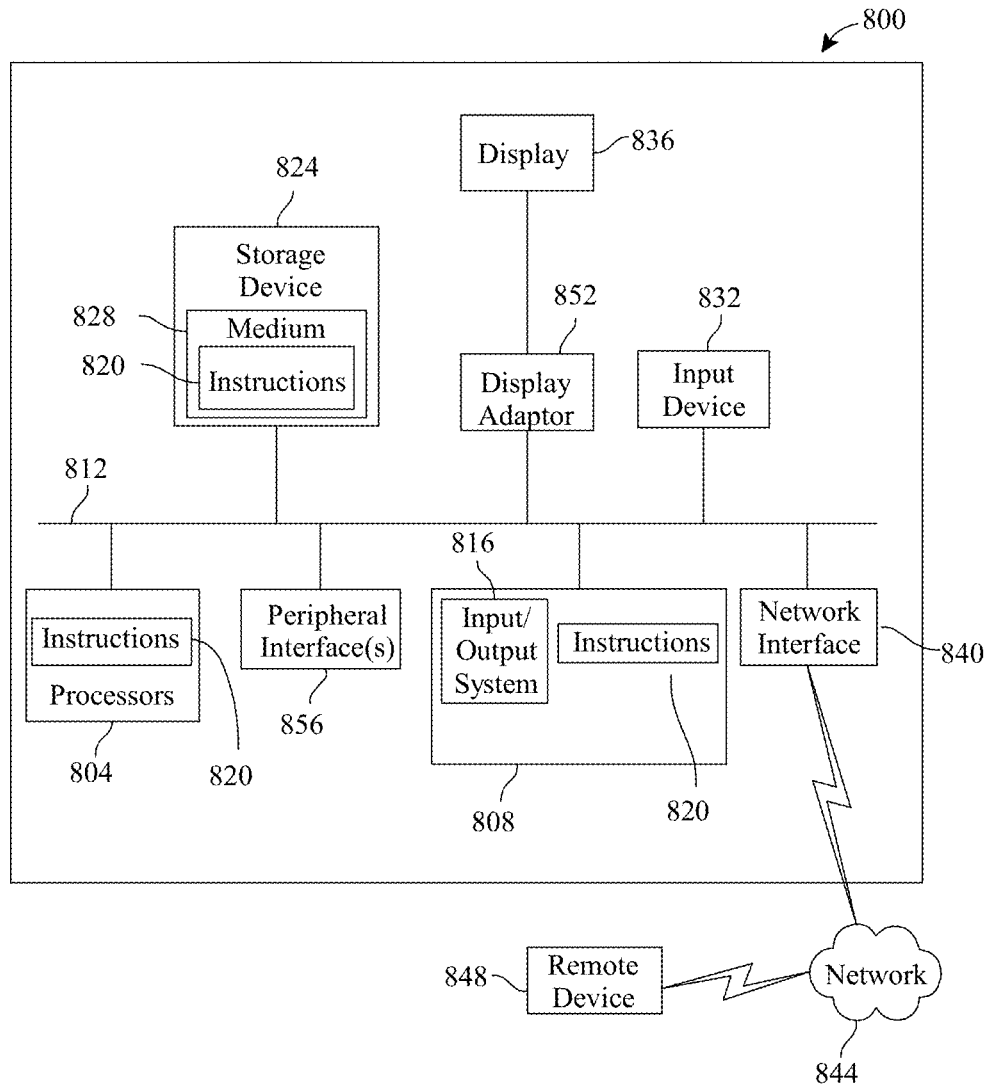
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, and the like.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, and the like.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, and the like.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for automated credential generation comprising:
   at least a processor; and
   a memory communicatively connected to the at least a processor, wherein the memory containing instructions configuring the at least a processor to:
      receive a data collection, wherein the data collection comprises a plurality of data objects, wherein the plurality of data objects comprises at least an attribute datum associated with a user;
      parse the data collection using a credential validation module;
      identify and extract the at least an attribute datum associated with the user based on the parsing of the data collection;
      classify the data collection to at least a credential datum as a function of the at least an attribute datum using the credential validation module; and
      generate a verifiable credential as a function of the at least a credential datum.

2. The apparatus of claim 1, wherein classifying the data collection further comprises utilizing a credential machine-learning model configured to correlate the at least an attribute datum to a validated credential class.

3. The apparatus of claim 2, wherein:
   the credential machine-learning model is trained using credential training data; and
   the credential training data comprises a plurality of data entries correlating the at least an attribute datum to the validated credential class.

4. The apparatus of claim 1, wherein the verifiable credential comprises a token representing a validation of the user.

5. The apparatus of claim 4, wherein the verifiable credential comprises a token representing an access level associated with the user.

6. The apparatus of claim 5, wherein the verifiable credential comprises a timeframe for the access level associated with the user.

7. The apparatus of claim 1, wherein the verifiable credential is a tokenized credential generated by a self-executable data structure.

8. The apparatus of claim 1, wherein the memory contains instructions configuring the at least a processor to store the verifiable credential in an immutable sequential listing.

9. The apparatus of claim 1, wherein the at least an attribute datum is a datum selected from the group consisting of legal identity, social identity, financial identity, proof of creation, proof of interaction, and proof of personhood.

10. The apparatus of claim 1, wherein the memory contains instructions configuring the at least a processor to limit access to the verifiable credential from a user community.

11. A method for automated credential generation comprising:
   receiving, by at least a processor, a data collection, wherein the data collection comprises a plurality of data objects, wherein the plurality of data objects comprises at least an attribute datum associated with a user;
   parsing, by the at least a processor, the data collection using a credential validation module;
   identifying and extracting, by the at least a processor, the at least an attribute datum associated with the user based on the parsing of the data collection;
   classifying, by the at least a processor, the data collection to at least a credential datum as a function of the at least an attribute datum using the credential validation module; and
   generating, by the at least a processor, a verifiable credential as a function of the at least a credential datum.

12. The method of claim 11 further comprises classifying, by the at least a processor, the data collection utilizing a machine-learning model configured to correlate the at least an attribute datum to a validated credential class.

13. The method of claim 12, wherein the machine-learning model is trained using credential training data; and the credential training data comprises a plurality of data entries correlating the at least an attribute datum to the validated credential class.

14. The method of claim 11, wherein the verifiable credential comprises a token representing a validation of the user.

15. The method of claim 14, wherein the verifiable credential comprises a token representing an access level associated with the user.

16. The method of claim 15, wherein the verifiable credential comprises a timeframe for the access level associated with the user.

17. The method of claim 11, wherein the verifiable credential is a tokenized credential generated by a self-executable data structure.

18. The method of claim 11, wherein the verifiable credential is stored in an immutable sequential listing.

19. The method of claim 11, wherein the at least an attribute datum is a datum selected from the group consisting of legal identity, social identity, financial identity, proof of creation, proof of interaction, and proof of personhood.

20. The method of claim 11 further comprises limiting, by the at least a processor, the access to the verifiable credential from a user community.

* * * * *